(12) United States Patent
Bellomo

(10) Patent No.: US 11,143,410 B1
(45) Date of Patent: Oct. 12, 2021

(54) HOLDER ASSEMBLY FOR A BURNER OF A GAS COOKING APPLIANCE

(71) Applicant: COPRECI, S.COOP., Aretxabaleta (ES)

(72) Inventor: Alberto Bellomo, Ponzano (IT)

(73) Assignee: COPRECI, S.COOP., Aretxabaleta (ES)

( * ) Notice: Subject to any disclaimer, the term of this patent is extended or adjusted under 35 U.S.C. 154(b) by 0 days.

(21) Appl. No.: 17/029,389

(22) Filed: Sep. 23, 2020

(30) Foreign Application Priority Data

Jul. 30, 2020 (EP) ..................................... 20382696

(51) Int. Cl.
*F24C 3/08* (2006.01)

(52) U.S. Cl.
CPC .................................. *F24C 3/085* (2013.01)

(58) Field of Classification Search
CPC ................................ F24C 3/082; F24C 3/085
USPC ..................... 126/39 E, 39 R, 39 B
See application file for complete search history.

(56) References Cited

U.S. PATENT DOCUMENTS

| 5,607,194 | A | 3/1997 | Ridenour |
| 5,735,685 | A | 4/1998 | Amaya-Orozco |
| 9,726,307 | B1* | 8/2017 | Frost ..................... F16L 13/147 |
| 2015/0040887 | A1* | 2/2015 | Angulo ................... F24C 3/085 |
| | | | 126/39 E |

\* cited by examiner

*Primary Examiner* — Vivek K Shirsat
(74) *Attorney, Agent, or Firm* — Edell, Shapiro & Finnan, LLC

(57) ABSTRACT

A holder assembly for a burner of a gas cooking appliance. According to one embodiment, the assembly includes a gas conduit, an injector partially housed at a first end of the gas conduit. The assembly further includes a burner base and an injector base arranged below the burner base, the injector base having a through hole in which portion of the first end of the gas conduit is arranged such that the injector is oriented towards the burner base. The through hole of the injector base has at least one non-circular coupling segment, and the gas conduit has a plastically deformed intermediate segment covering the coupling segment.

20 Claims, 19 Drawing Sheets

US 11,143,410 B1

HOLDER ASSEMBLY FOR A BURNER OF A GAS COOKING APPLIANCE

CROSS-REFERENCE TO RELATED APPLICATIONS

This application relates to and claims the benefit and priority to European Appl. No. EP20382696.1, filed Jul. 30, 2020.

The present invention relates to holder assemblies for a burner of a gas cooking appliance and to gas cooking appliances incorporating said holder assemblies.

BACKGROUND

Holder assemblies for a burner of a gas cooking appliance are known.

On one hand, are known the holder assemblies comprising a gas conduit, an injector holder arranged around a first end of said gas conduit, an injector housed partially in said first end of the gas conduit, and a burner holder coupled by means of a nut to the injector holder. For example U.S. Pat. No. 5,735,685B1 describes a holder assembly of this type.

On the other hand, holder assemblies dispensing with the injector holder are known. Thus, for example, U.S. Pat. No. 9,726,307B1 describes a holder assembly comprising a gas conduit, an injector partially housed at a first end of said gas conduit, and a holder comprising a burner base and an injector base arranged below the burner base, the injector base comprising a through hole in which the first end of the gas conduit is arranged such that the injector is oriented towards the burner base. The gas conduit comprises an intermediate segment that is plastically deformed before introducing the first end of the gas conduit in the through hole of the injector base such that said intermediate segment abuts with the lower surface of the injector base.

SUMMARY

Disclosed is a holder assembly for a burner of a gas cooking appliance, and a gas cooking appliance incorporating said holder assembly.

A first aspect of the invention relates to a holder assembly for a burner of a gas cooking appliance.

The holder assembly of the invention comprises a gas conduit, an injector partially housed at a first end of said gas conduit, and a holder comprising a burner base and an injector base arranged below the burner base. The injector base comprises a through hole in which a portion of the first end of the gas conduit is arranged such that the injector is oriented towards the burner base. The first end of the gas conduit comprises a plastically deformed intermediate segment for coupling said gas conduit to the injector base.

The through hole of the injector base comprises at least one coupling segment with a cross-section larger than the cross-section of the gas conduit when said gas conduit is introduced in said through hole, the intermediate segment of the gas conduit being formed after the gas conduit is introduced in the through hole of the injector base, such that the intermediate segment of the gas conduit is plastically deformed covering said coupling segment. The coupling segment has a non-circular cross-section for angularly retaining the gas conduit with respect to the holder.

A second aspect of the invention relates to a gas cooking appliance comprising at least one holder assembly such as the one described in the first aspect of the invention.

The holder assembly of the invention is easier to assemble. The plastic deformations performed in the gas conduit not only allow said gas conduit and the holder to be axially coupled, but also since it is a coupling that angularly fixes both parts, when the injector is fixed to the first end of the gas conduit, it is not necessary to retain the gas conduit so that it does not rotate.

These and other advantages and features of the invention will become apparent in view of the figures and detailed description.

DETAILED DESCRIPTION

Figure 1:
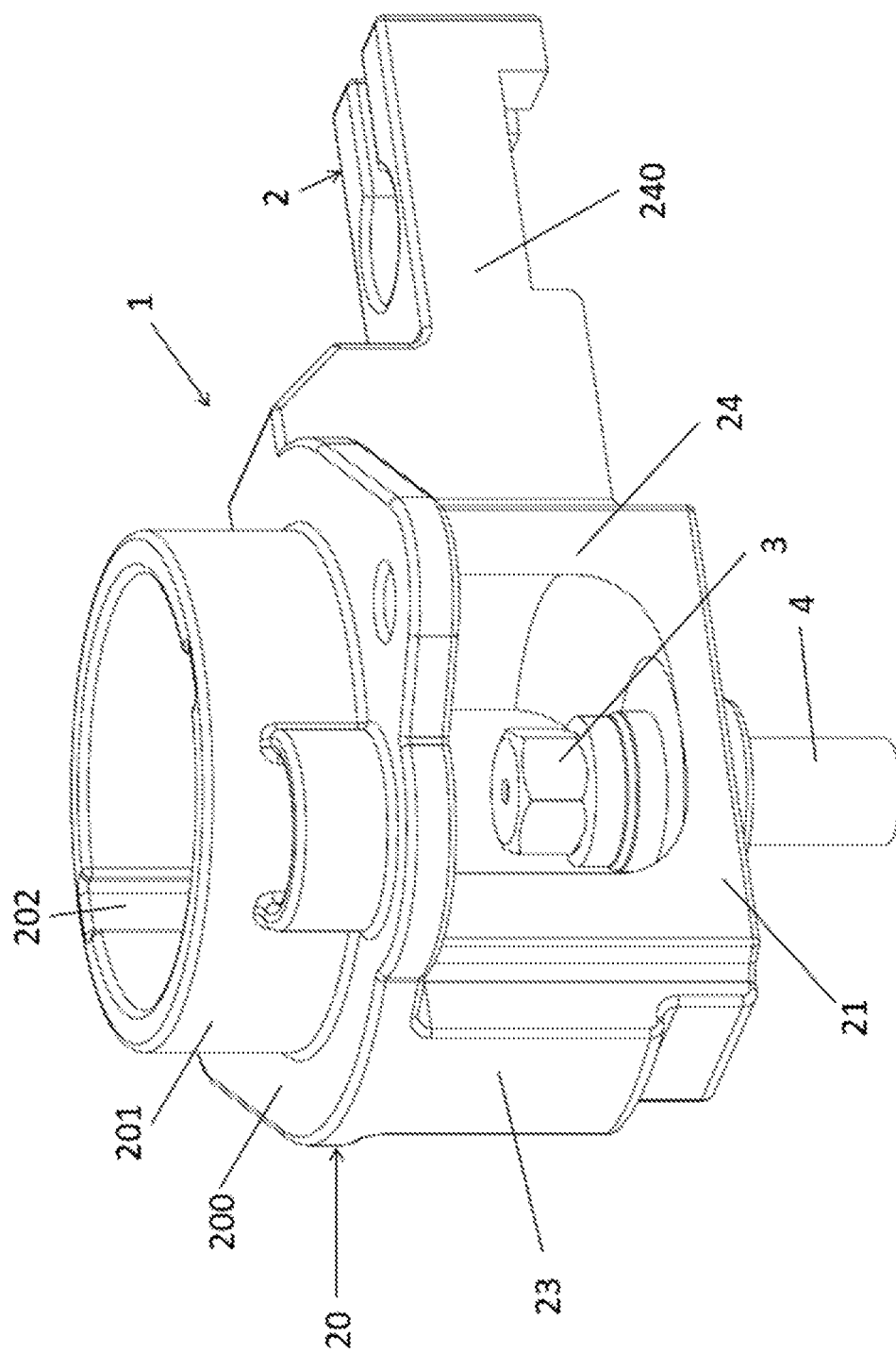
FIG. 1 shows a perspective view of a first embodiment of a holder assembly of the invention.
Figure 2:
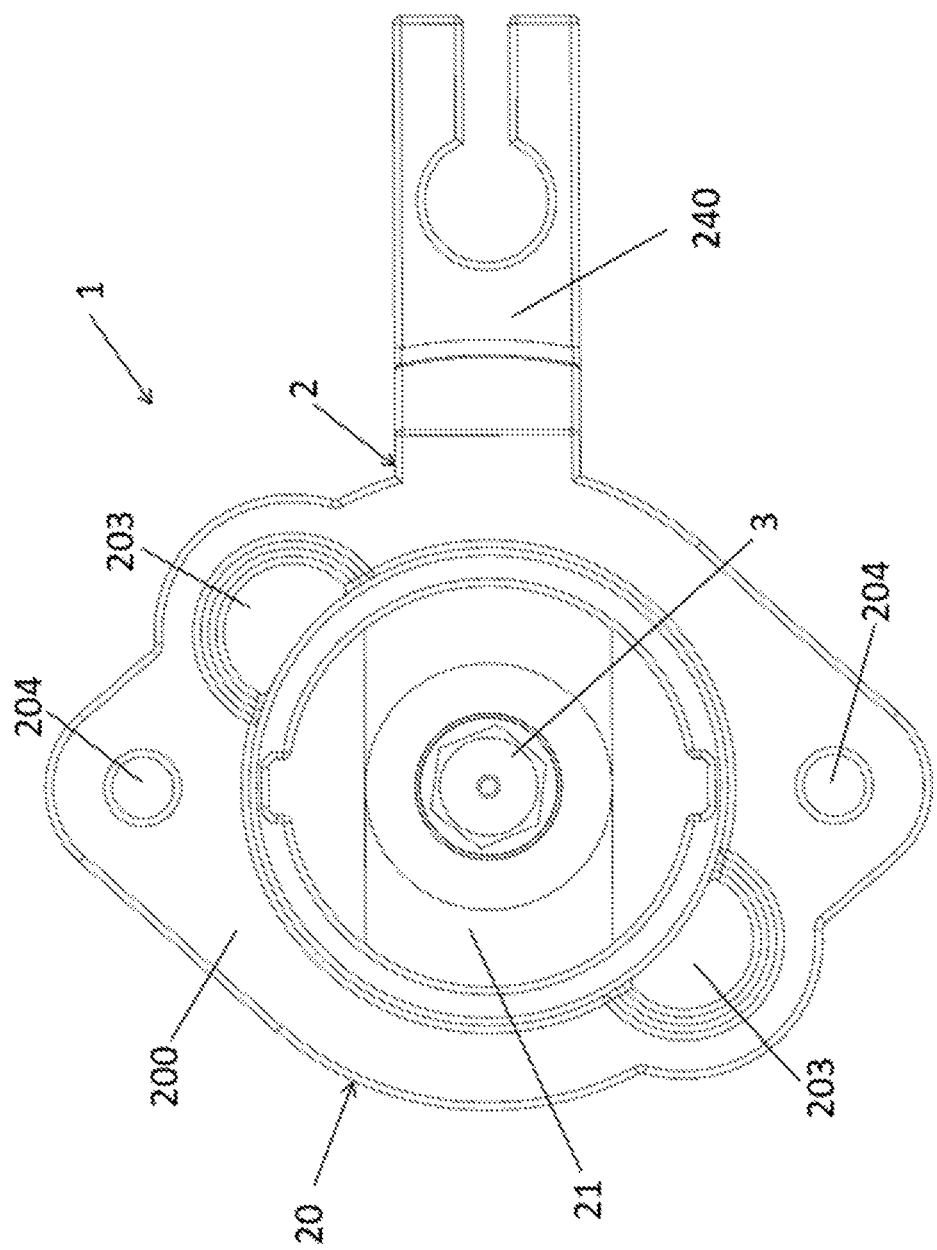
FIG. 2 shows a plan view of the holder assembly of FIG. 1.
Figure 3:
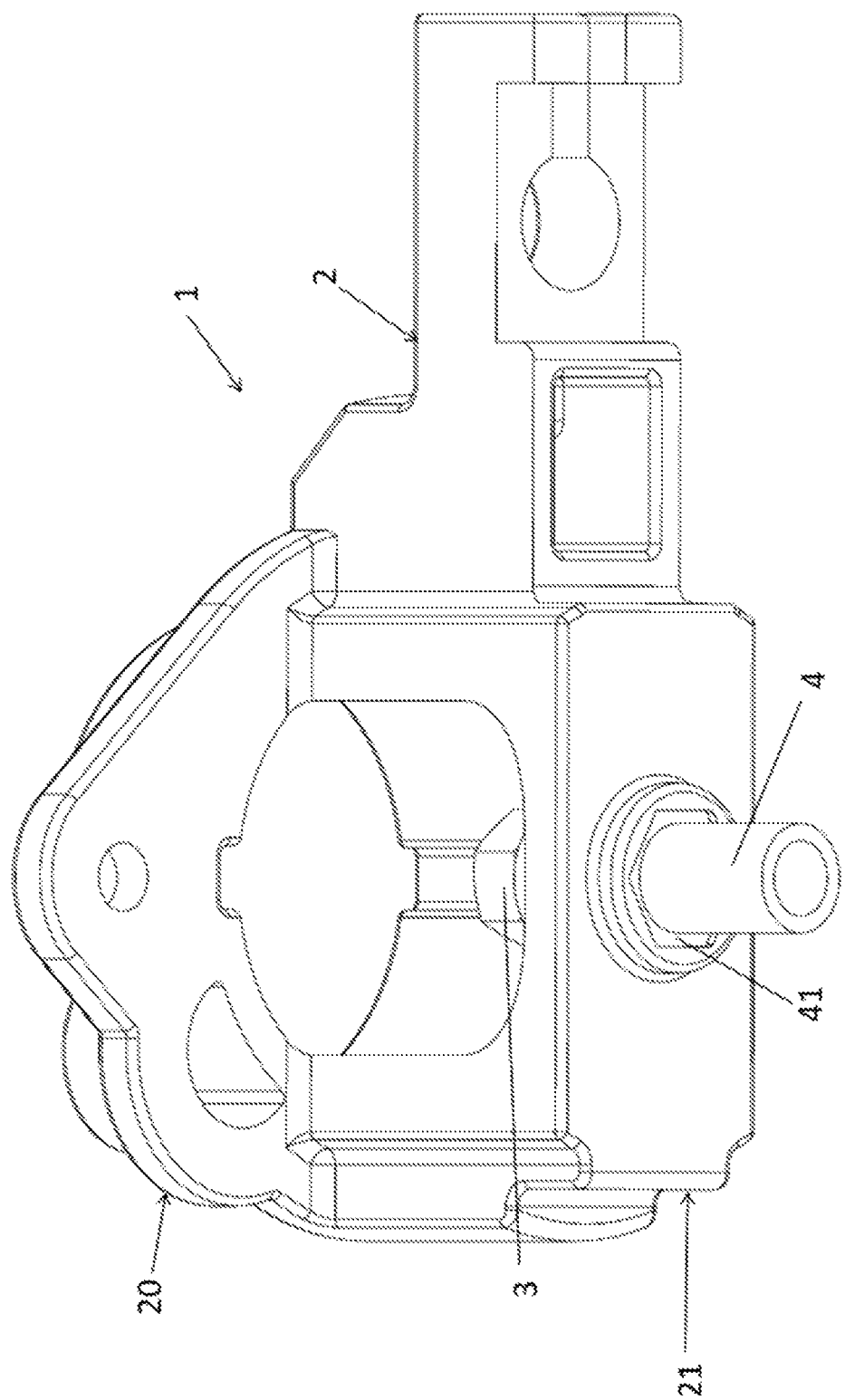
FIG. 3 shows a second perspective view of the holder assembly of FIG. 1.
Figure 4:
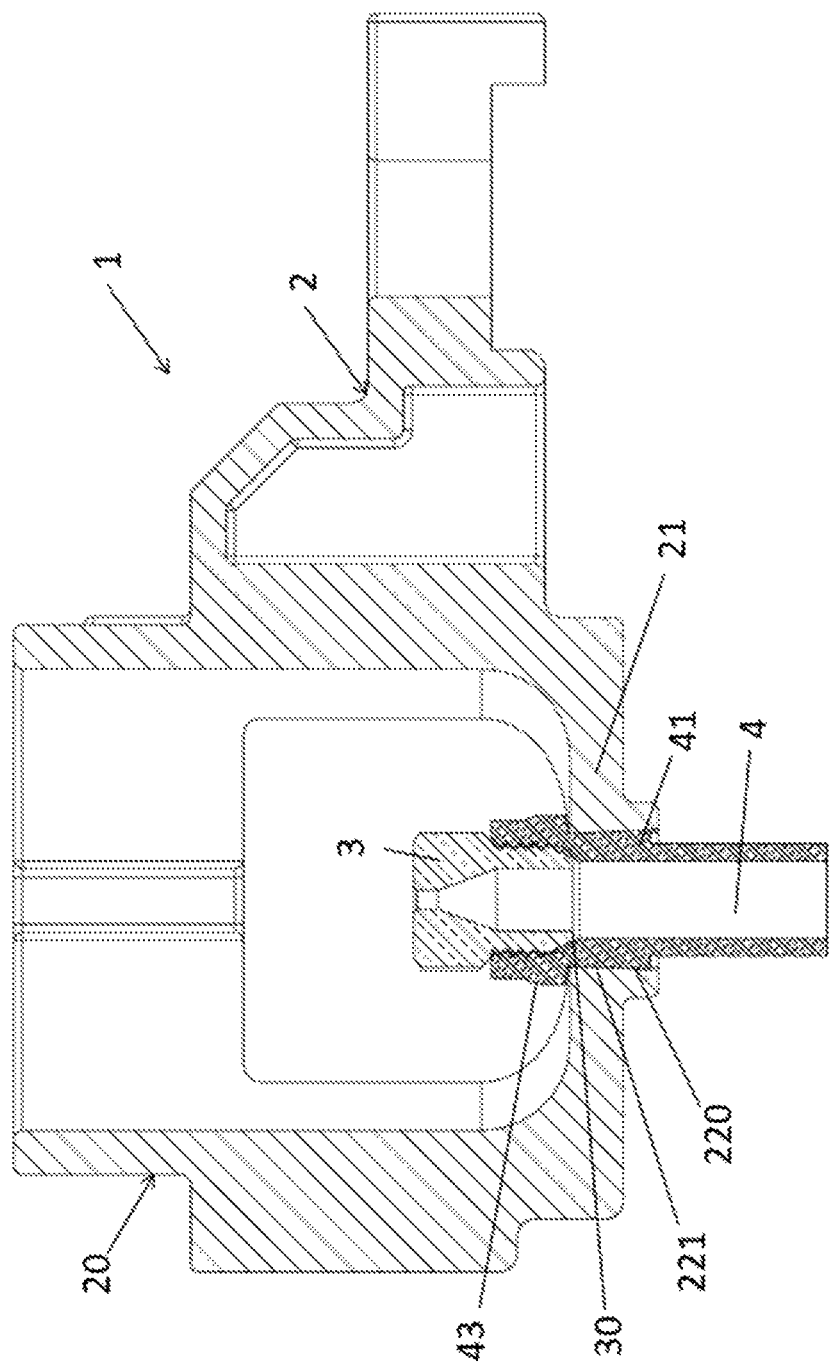
FIG. 4 shows a sectional view of the holder assembly of FIG. 1.
Figure 5:
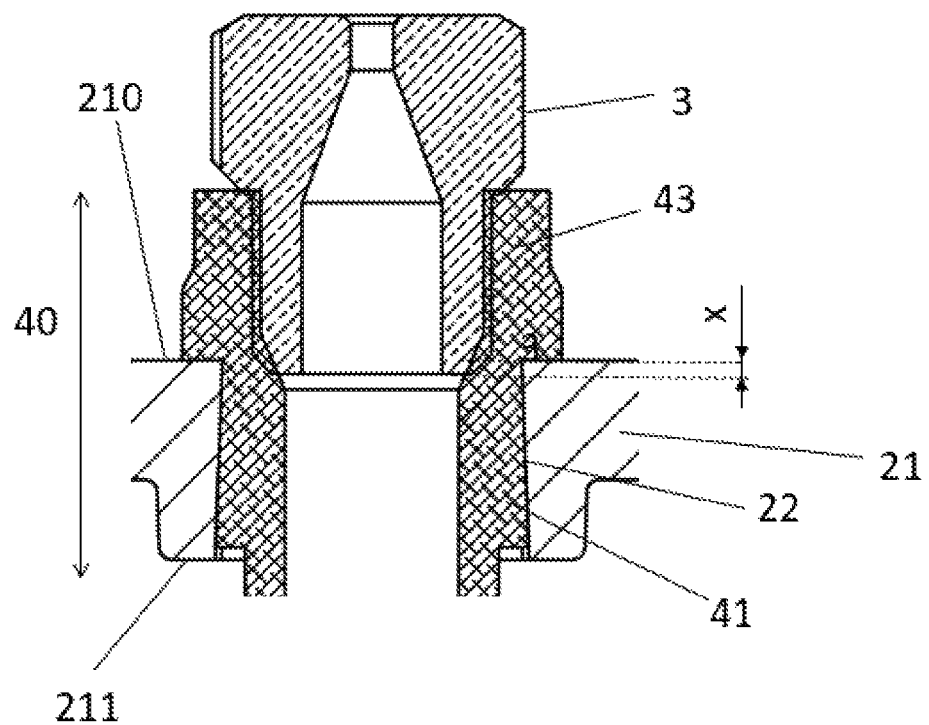
FIG. 5 shows a partial sectional view of the holder assembly of FIG. 1.
Figure 6:
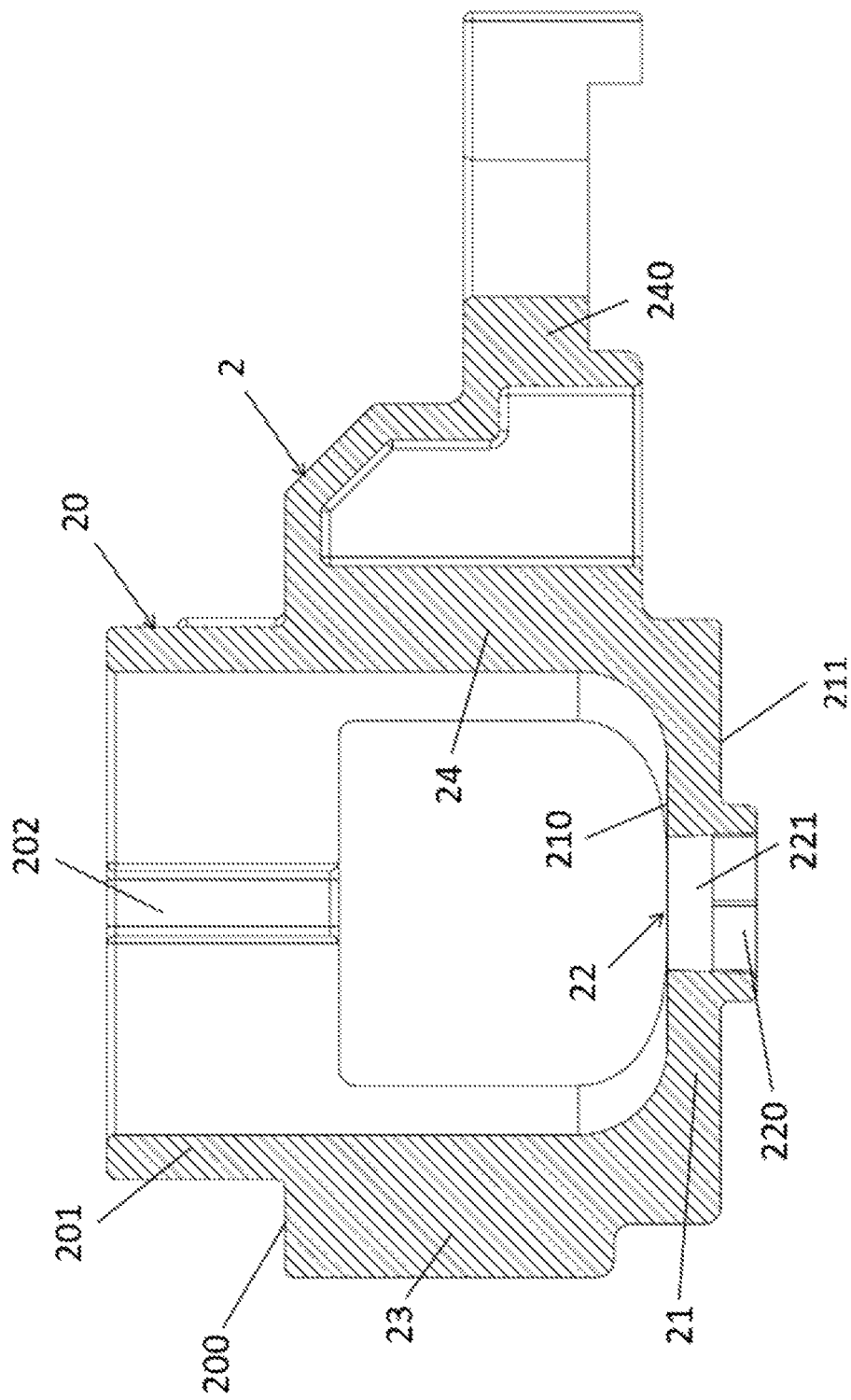
FIG. 6 shows a sectional view of the holder of the holder assembly of FIG. 1.

A first aspect of the invention relates to a holder assembly 1 for a burner of a gas cooking appliance.

The holder assembly 1 comprises a gas conduit 4, an injector 3, and a holder 2. The injector 3 is arranged partially housed at a first end 40 of the gas conduit 4.

The holder 2 comprises a burner base 20 configured for being coupled to a burner body (not shown in the figures) and an injector base 21 arranged below the burner base 20. The injector base 21 comprises a through hole 22 in which a portion of the first end 40 of the gas conduit 4 is arranged such that the injector 3 is oriented towards the burner base 20. Thus, when a burner body is arranged such that it is coupled to the burner base 20, the injector 3 is fluidly communicated with said burner. Preferably the holder 2 is formed by a single part defining the burner base 20 and the injector base 21. Preferably the burner base 20 and the injector base 21 are attached to one another by means of at least one attachment arm 23, 24.

The first end 40 of the gas conduit 4 comprises a plastically deformed intermediate segment 41 for coupling said gas conduit 4 to the injector base 21.

The through hole 22 of the injector base 21 comprises at least one coupling segment 220 with a cross-section larger than the cross-section of the gas conduit 4 when said gas conduit 4 is introduced in said through hole 22. Thus, the intermediate segment 41 of the gas conduit 4 is formed after the gas conduit 4 is introduced in the through hole 22 of the injector base 21, such that the gas conduit 4 is plastically deformed covering said coupling segment 220, thus obtaining the intermediate segment 41 with a shape complementary to the coupling segment 220 of the through hole 22 of the injector base 21.

The coupling segment 220 has a non-circular cross-section for angularly retaining the gas conduit 4 with respect to the holder 2. Therefore, since the gas conduit 4 is fixed angularly to the holder 2, when the injector 3 is fixed to the gas conduit 4 it is not necessary to secure the gas conduit 4 so that it is not rotate, as it is sufficient to secure the holder 2. Preferably the wall of the gas conduit 4 is thin, so not having to secure the gas conduit 4 to enable fixing the injector 3 avoids the risk of generating undesired deformations in the gas conduit 4, because when the injector 3 is fixed to said gas conduit 4 high pressure must be exerted. Preferably the injector 3 is screwed onto the first end 40 of the gas conduit 4 for the fixing thereof.

Thus, the process of assembling the holder assembly 1 would preferably be as follows. First, the holder 2 and the gas conduit 4 are positioned with respect to one another, such that a portion of the first end 40 of the gas conduit 4 is housed in the through hole 22 of the injector base 21 of the holder 2. Once the gas conduit 4 and the holder 2 have been positioned and secured, the gas conduit 4 is plastically deformed, at least the intermediate segment 41 being formed. After said plastic deformation, preferably the final portion of the first end 40 of the gas conduit 4 is threaded. Lastly, the injector 3 is fixed to the first end 40 of the gas conduit 4, preferably by screwing the injector 3 on the portion that has been previously threaded, although said fixing could be done using any other technique known to the person skilled in the art. During the process of fixing the injector 3, securing the holder 2 is sufficient because the anti-rotation coupling between the gas conduit 4 and the holder 2 ensures the angular retention of the gas conduit 4 with respect to the holder 2. Preferably, before being plastically deformed, the gas conduit 4 has a uniform tubular shape, i.e., before being plastically deformed the first end 40 of the gas conduit 4 preferably has the same shape as the intermediate portion 44 arranged after said first end 40.

Preferably, in the event that the coupling segment 220 does not cover the entire length of the through hole 22 of the injector base 21, when plastic deformation of the gas conduit 4 occurs not only is formed the intermediate segment 41 but rather the rest of the gas conduit 4 arranged inside through hole 22 is also plastically deformed, such that the entire outer surface of the portion of the first end 40 of the gas conduit 4 housed inside the through hole 22 has a shape complementary to said through hole 22 once the gas conduit 4 has been plastically deformed.

Preferably the coupling segment 220 has a polygonal cross-section, for example a hexagonal cross-section.

Preferably the end 30 of the injector 3 housed inside the first end 40 of the gas conduit 4 is fixed in an airtight manner against the inner surface of the gas conduit 4, said end 30 of the injector 3 being arranged on the same level as the through hole 22 of the injector base 21. Thus, when the injector 3 is fixed to the gas conduit 4, the holder 2 prevents radial expansion of the outer surface of the gas conduit 4 in said area in which the gas conduit 4 is surrounded by the holder 2. It is essential to ensure proper sealing between the gas conduit 4 and the injector 3. As discussed above, preferably the wall forming the gas conduit 4 is thin, so when the injector 3 is fixed to said gas conduit 4, the pressure exerted on the wall of the gas conduit 4 may cause said wall to yield and therefore impede the sealing between both parts. In holder assemblies of the state of the art, the sealing between the injector and the gas conduit is often carried out at the end of the gas conduit arranged on the upper surface of the injector base. However, in these cases the gas conduit may yield radially, making it impossible to obtain proper sealing between injector and the gas conduit. This is why preferably the end 30 of the injector 3 coincides with the portion of the first end 40 of the gas conduit 4 arranged inside the through hole 22 of the injector base 2. Therefore, the holder 2 itself contains the radial expansion of the wall of the gas conduit 4 such that proper sealing is obtained between the injector 3 and the gas conduit 4.

Preferably the end 30 of the injector 3 housed inside the gas conduit 4 is frustoconical-shaped. In the same way, preferably the area of the inner surface of the gas conduit 4 in which sealing is performed also has a frustoconical shape to make it easier to obtain proper sealing. Preferably the frustoconical shape of the interior of the gas conduit 4 is formed when the first end 40 of the gas conduit 4 is plastically deformed to form the intermediate segment 41.

Preferably, the coupling between the holder 2 and the gas conduit 4 not only retains the gas conduit 4 angularly with respect to the holder but it also retains it axially. To that end, preferably the final segment 43 of the first end 40 of the gas conduit 4 is plastically deformed on the injector base 21. Thus, the final segment 43 abuts with the gas conduit 4 with respect to the upper surface 210 of the injector base 21. Preferably, this final segment 43 is formed when the intermediate segment 41 is formed.

Furthermore, preferably part of the intermediate segment 41 of the gas conduit 4 abuts with an inner surface of the through hole 22.

Alternatively, at least one segment of the through hole 22 has a larger width in the portion thereof closer to the lower surface 211 of the injector base 21 than the width of said segment of the through hole 22 arranged farther away from said lower surface 211, such that the portion of the gas conduit 4 coinciding with said segment of the through hole 22 will also have a cross-section with a larger width in the portion arranged closer to the lower surface 211 of the injector base 21 than the width of the cross-section of said segment arranged farther away from said lower surface 211. Preferably the width of the through hole 22 progressively decreases as it moves away from the lower surface 211. Preferably said segment covers the entire length of the through hole 22, i.e., the width of the through hole 22 gradually decreases as it moves away from the lower surface 211. Preferably said width gradually decreases with an inclination of between 1° and 10°.

Alternatively the gas conduit may comprise a stop segment supported on the lower surface of the injector base.

FIGS. 1 to 8 show a first embodiment of the holder assembly 1 according to the invention.

The holder 2 of the holder assembly 1 of this first embodiment is an injected part, preferably an injected aluminum part. As discussed above, the holder 2 comprises an injector base 21 and a burner base 20.

In this first embodiment the injector base 21 has is substantially rectangular prism-shaped. The injector base 21 comprises an upper surface 210 arranged facing the burner base 20 and a lower surface 211. The through hole 22 of the injector holder 21 extends between said upper surface 210 and said lower surface 211. In this first embodiment in addition to the coupling segment 220 the through hole 22 comprises a circular section segment 221, the coupling segment 220 being arranged below the circular section segment 221. In this first embodiment the coupling segment 220 has a hexagonal-shaped cross-section.

In this first embodiment the burner base 20 comprises a horizontal surface 200, and a cylindrical wall 201 projecting upwards from said horizontal surface 200, said cylindrical wall 201 defining a central housing configured for being coupled to a burner body, such that said central housing and the injector 3 below the central housing in the injector base 11 are in fluid communication. In this first embodiment the cylindrical wall 201 comprises two vertical positioning slots 202 on its inner surface arranged every 180° and configured for being coupled to respective protrusions of a burner body. Furthermore, the burner base 20 comprises two primary air ports 203 arranged after the cylindrical wall 201 which allow the passage of air from outside the gas cooking appliance in which the holder assembly 1 is arranged into same. Furthermore, the horizontal surface 200 of the burner base 20 comprises two fixing holes 204 configured for enabling the holder assembly 1 to be fixed to the corresponding cooking appliance.

In this first embodiment the injector base 21 and the burner base 20 are attached to one another through a first attachment arm 23 and a second attachment arm 24. The first attachment arm 23 and the second attachment arm 24 protrude orthogonally from two opposite sides of the injector base 21 upwardly, attaching said injector base 21 with the burner base 20. Furthermore, in this first embodiment the second attachment arm 24 comprises a radial extension 240 protruding and extending axially from said attachment arm 24. The radial extension 240 comprises a hole configured for supporting a spark electrode (not shown in the figures).

Figure 7:
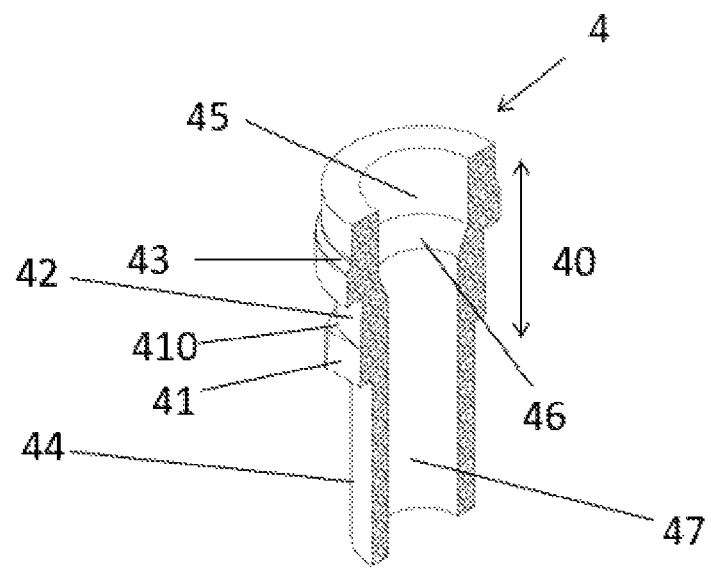
FIG. 7 shows a sectional view of the gas conduit of the holder assembly of FIG. 1.

FIG. 7 shows the gas conduit 4 of this first embodiment of the holder assembly 1, once it has been plastically deformed. FIG. 7 shows the first end 40 of the gas conduit 4, as well as a piece of the intermediate portion 44 attaching said first end 40 with a second end (not shown in the figures). The second end of the gas conduit 4 is configured for being coupled to the outlet of a corresponding gas valve. Before being plastically deformed, preferably the gas conduit 4 has a uniform tubular shape, i.e., before being plastically deformed the first end 40 of the gas conduit 4 preferably has the same shape as the intermediate portion 44 shown in FIG. 7. The first end 40 comprises the intermediate segment 41, having in this first embodiment a hexagonal cross-section complementary to the coupling segment 220 of the through hole 22 of the injector base 21. Furthermore, in this first embodiment the first end 40 comprises an additional segment 42 arranged after the intermediate segment 41. The additional segment 42 is housed in the circular section segment 221 of the through hole 22 and is also plastically deformed, obtaining a larger diameter than that of the gas conduit 4 before being plastically deformed. Thus, the additional segment 42 has a cross-section complementary to the circular section segment 221 of the through hole 22. In this first embodiment the first end 40 of the gas conduit 4 also comprises a final segment 43 after the additional segment 42. Said final segment 43 is also plastically deformed after the gas conduit 4 is introduced in the through hole 22 of the injector base 21. Therefore, in this first embodiment the first end 40 of the gas conduit 4 is formed by the intermediate segment 41, the additional segment 42, and the final segment 43, the intermediate segment 41 and the additional segment 42 being housed inside the through hole 22 of the injector base 21 whereas the final segment 43 is arranged on the upper surface 210 of the injector base 21. The final segment 43 of the gas conduit 4 comprises the mouth of the gas conduit 4 through which the injector 3 is introduced. In this first embodiment, when the gas conduit 4 is plastically deformed the inner surface of the gas conduit 4 is also deformed, obtaining a funnel-shaped inner surface of the gas conduit 4 with a first cylindrical portion 45, a frustoconical-shaped intermediate portion 46, and a second cylindrical portion 47 having a smaller diameter than the first cylindrical portion 45. Preferably once the gas conduit 4 is plastically deformed, the first cylindrical portion 45 of the inner surface of the gas conduit 4 is threaded to enable screwing on the injector 3 later.

Figure 8:
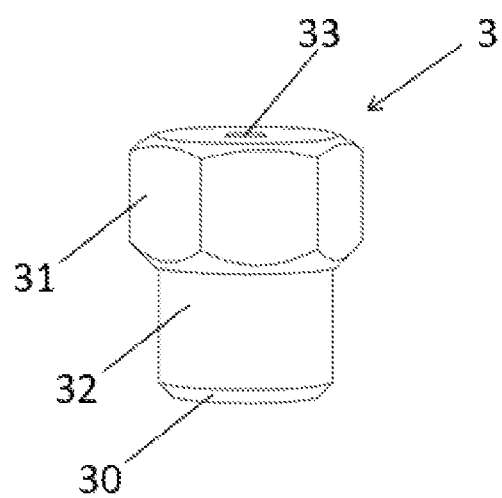
FIG. 8 shows a view of the injector of the holder assembly of FIG. 1.

FIG. 8 shows the injector 3 of this first embodiment of the holder assembly 1. Said injector 3 comprises a central through hole 33 which allows the passage of gas through the inside of said injector 3. The injector 3 further comprises a head 31 arranged on the outside of the gas conduit 4, a cylindrical body 32 arranged in the first cylindrical portion of the gas conduit 4, and a frustoconical end 30 after said cylindrical body 32 and arranged in the frustoconical-shaped intermediate portion 46 of the gas conduit 4. The outer surface of the cylindrical body 32 of the injector 3 is preferably threaded.

In this first embodiment the end 30 of the injector 3 is fixed in an airtight manner against the inner wall of the gas conduit 4, namely against the frustoconical-shaped intermediate portion 46 of the gas conduit 4. Preferably the fixing between the gas conduit 4 and the injector 3 is a threaded fixing, although in other possible embodiments said fixing could be carried out in any other way known to the person skilled in the art. As shown in detail in FIG. 5, in this first embodiment in order to ensure the air-tightness of said attachment between the gas conduit 4 and the injector 3, at least a portion of the end 30 of the injector 3 and at least a portion of the frustoconical-shaped intermediate portion 46 of the gas conduit 4 are on the same level as the through hole 22 of the injector base 21 (see area "x" indicated in FIG. 5), such that when the injector 3 is fixed to the gas conduit 4, the holder 2 prevents radial expansion of the outer wall of the gas conduit 4 in said area.

As shown in detail in FIG. 7, in this first embodiment the intermediate segment 41 comprises an upper horizontal surface 410 protruding radially with respect to the additional segment 42. Therefore, said upper horizontal surface 410 of the intermediate segment 41 abuts with a complementary horizontal surface of the through hole 22 of the injector base 21 of the holder 2. Thus, cooperation between said upper horizontal surface 410 of the intermediate segment 41 and the final segment 43 of the gas conduit 4 with the surfaces of the injector base 21 against which they abut fix the gas conduit 4 axially with respect to the holder 2.

Figure 9:
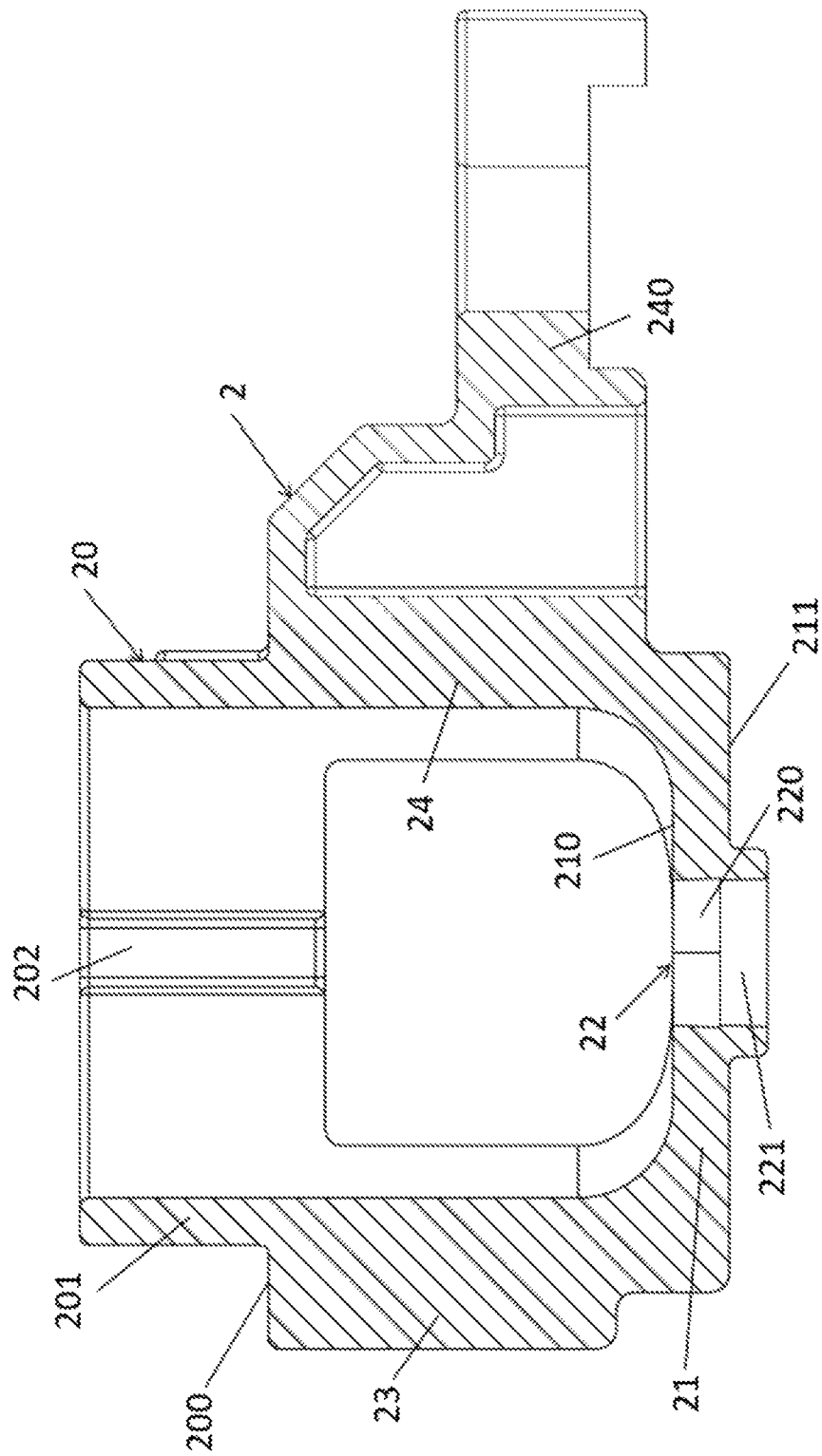
FIG. 9 shows a sectional view of a holder according to a second embodiment of the holder assembly.
Figure 10:
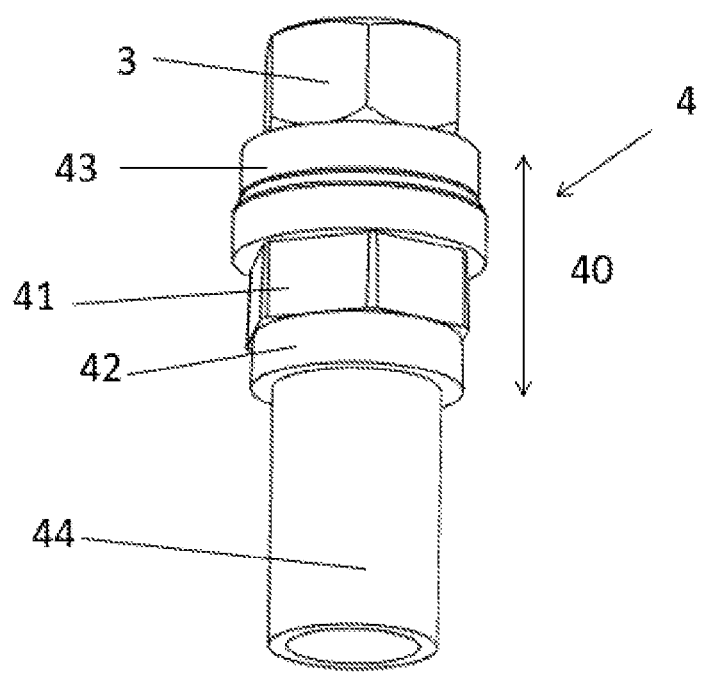
FIG. 10 shows a perspective view of the gas conduit and the injector of the second embodiment of the holder assembly.

FIGS. 9 and 10 show a second embodiment of the invention.

This second embodiment differs from the first embodiment in the configuration of the through hole 22 of the injector base 21 of the holder 2 of the holder assembly 1 and accordingly of the outer shape of the first end 40 of the gas conduit 4. The rest of the features are similar to those of the first embodiment so it is not considered necessary to describe them again.

In this second embodiment the through hole 22 of the injector base 21 of the holder 2 comprises a coupling segment 220 and a circular section segment 221 arranged below the coupling segment 220. In the same way, once the gas conduit 4 has been plastically deformed, it comprises an intermediate segment 41 arranged after the final segment 43, and an additional segment 42 arranged after the intermediate segment 41. Like in the first embodiment, in this second embodiment the intermediate segment 41 of the gas conduit 4 and the coupling segment 220 of the through hole 22 of the injector base 21 have a complementary hexagonal shape such that the gas conduit 4 is retained angularly with respect to the holder 2.

Furthermore, in this second embodiment the width of the through hole 22 progressively decreases as it moves away from the lower surface 211, i.e., the width of the circular section segment 221 gradually decreases as it moves away from the lower surface 211 of the injector base 21 and the width of the coupling segment 220 gradually decreases as it moves closer to the upper face 210 of the injector base 21. Accordingly, the cross-section of the intermediate segment 41 and the additional segment 42 of the gas conduit 4 also has a decreasing width complementary to the through hole 22. In this way cooperation between the gas conduit 4 and the through hole 22 not only retains the gas conduit 4 angularly with respect to the holder 2 but furthermore collaborates in retaining the gas conduit 4 axially with respect to the holder 2. Thus, the gas conduit 4 is retained axially with respect to the holder 2 by means of the final segment 43 abutting with the upper surface 210 of the injector base 21 and the decreasing width of the through hole 22.

Figure 11:
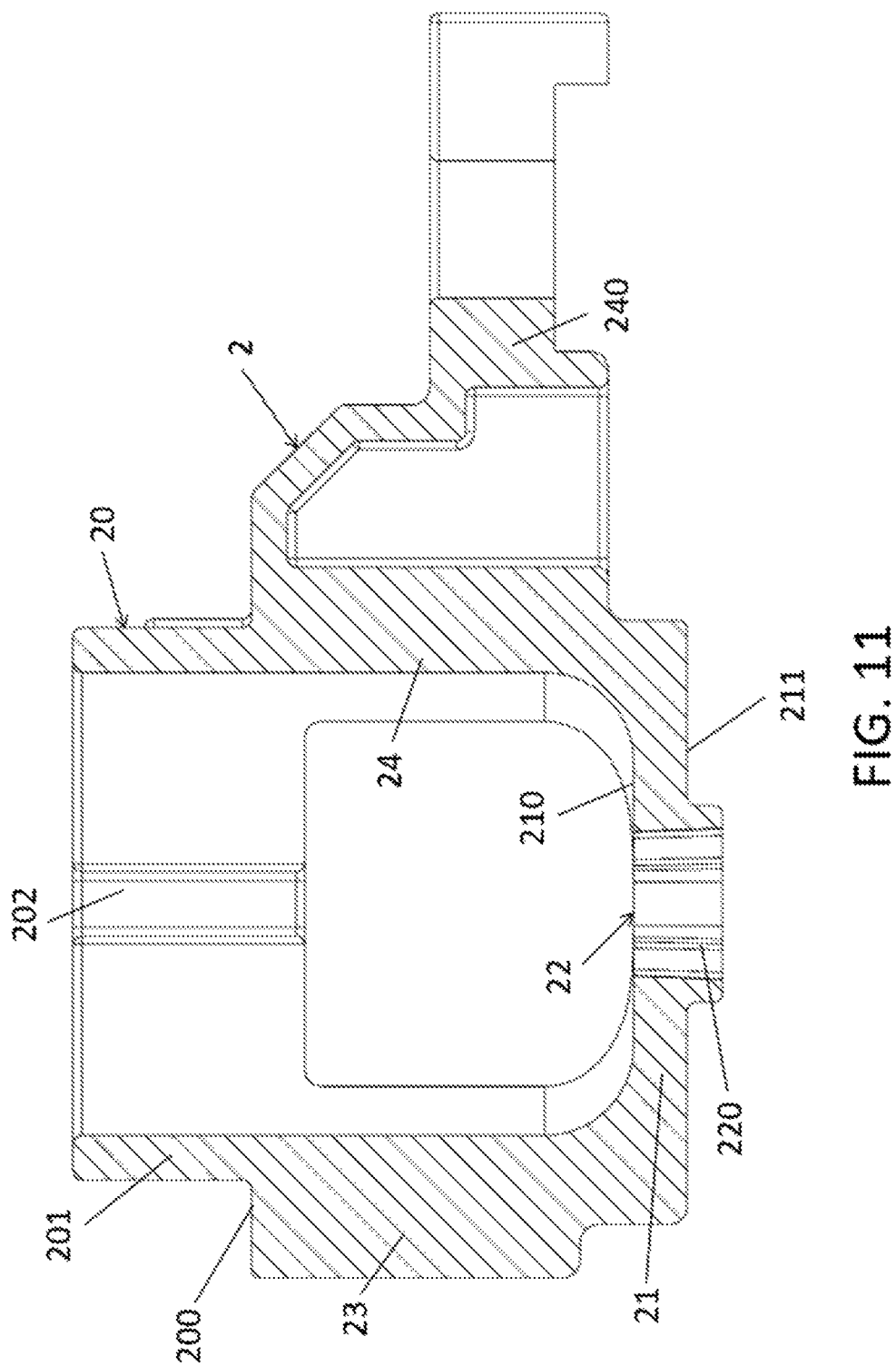
FIG. 11 shows a sectional view of a holder according to a third embodiment of the holder assembly.
Figure 12:
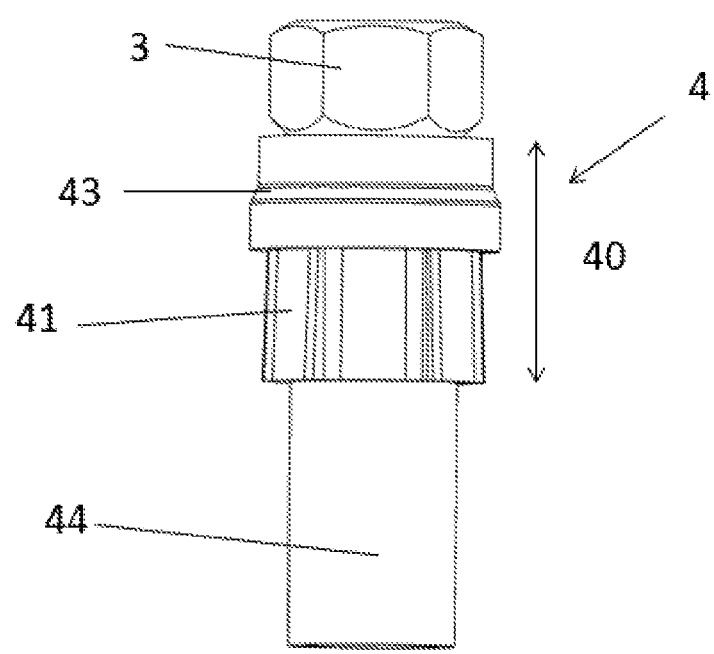
FIG. 12 shows a perspective view of the gas conduit and the injector of the third embodiment of the holder assembly.
Figure 13:
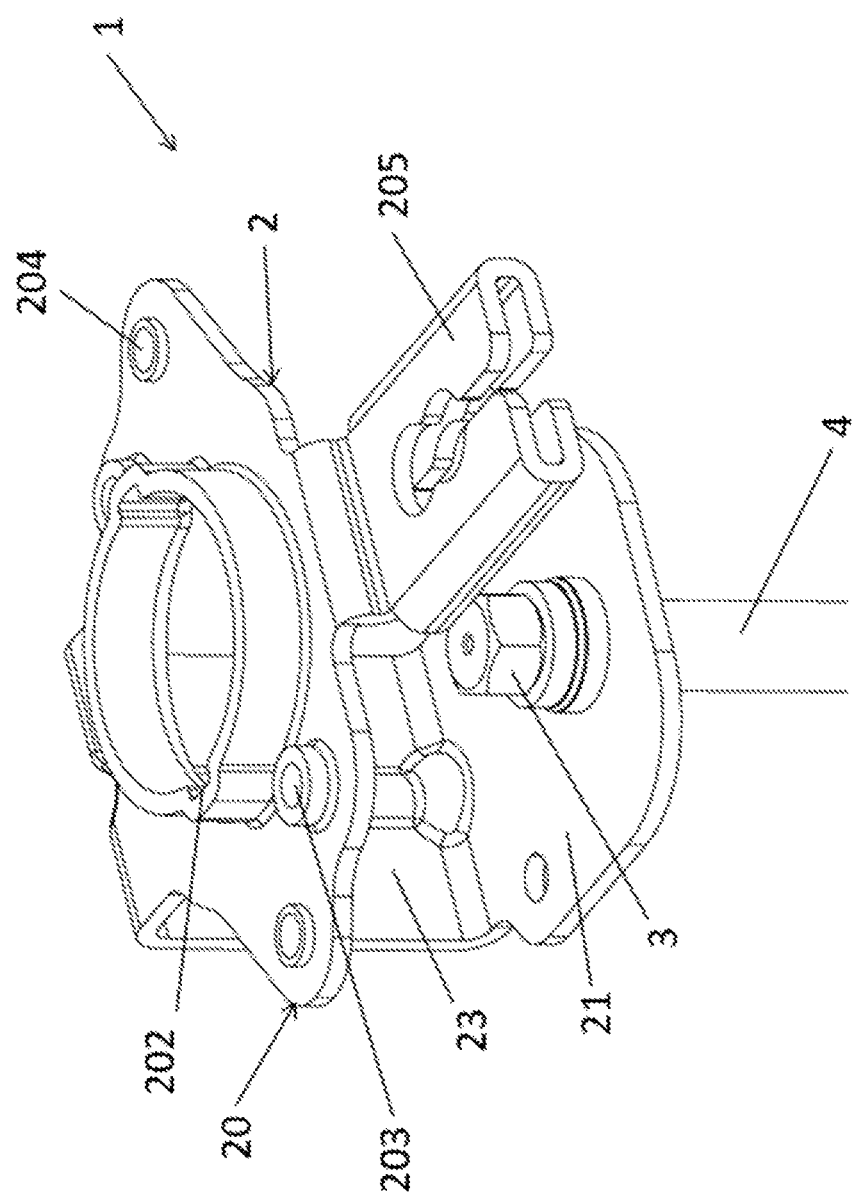
FIG. 13 shows a perspective view of a fourth embodiment of a holder assembly.
Figure 14:
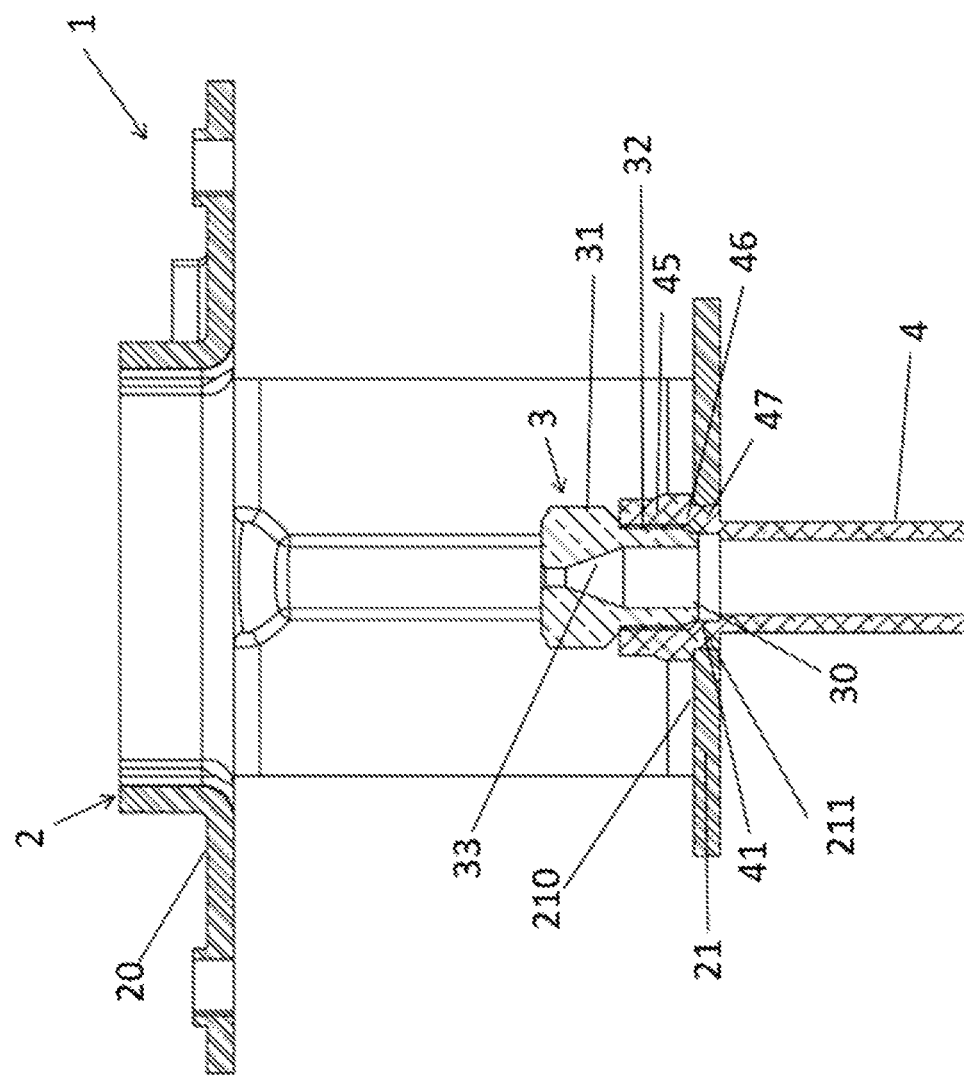
FIG. 14 shows a sectional view of the holder assembly of FIG. 13.
Figure 15:
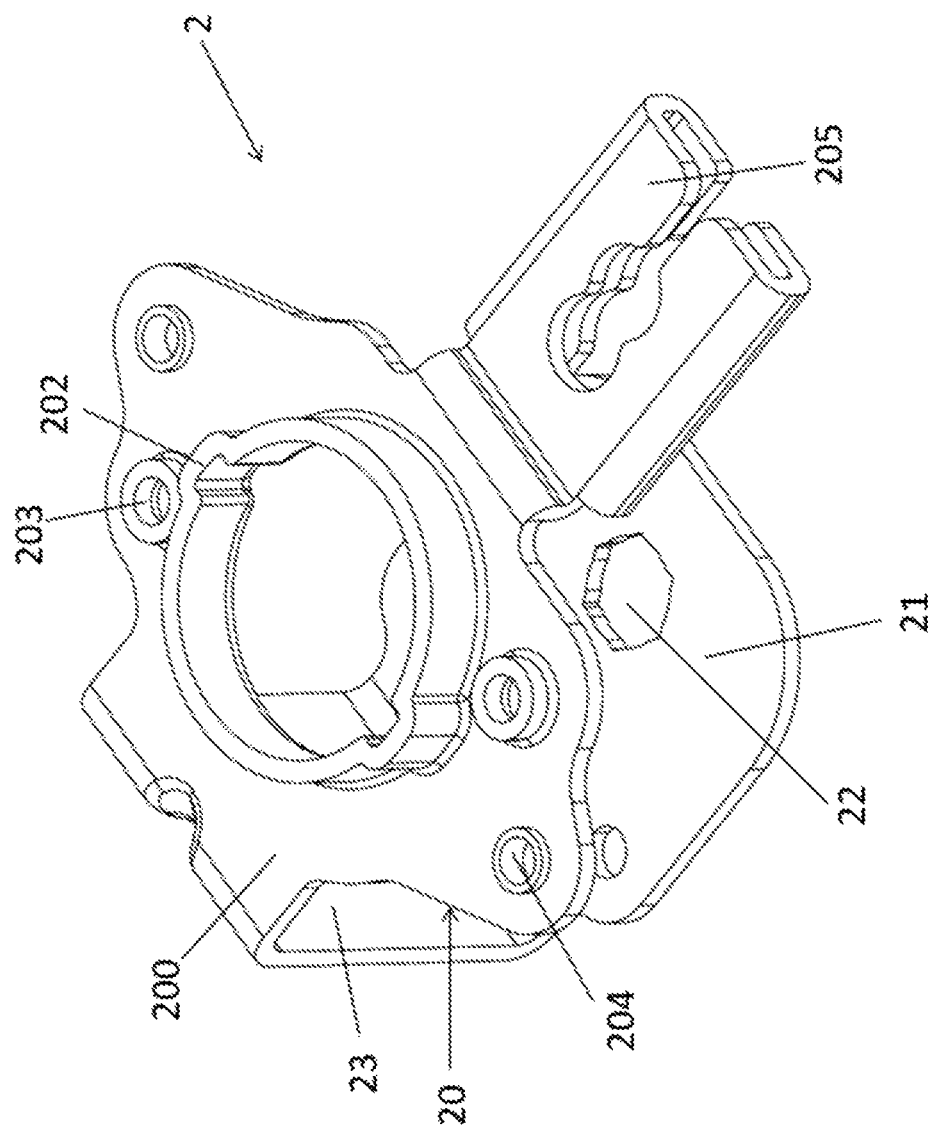
FIG. 15 shows a perspective view of the holder of the holder assembly of FIG. 13.

FIGS. 11 and 12 show a third embodiment of the invention.

This third embodiment differs from the first embodiment in the shape of the through hole 22 of the injector base 21 of the holder 2, and accordingly in the outer shape of the first end 40 of the gas conduit 4. The rest of the features are similar to those of the first embodiment so it is not considered necessary to describe them again.

In this third embodiment the coupling segment 220 of the through hole 22 of the injector base 21 covers the entire length of said through hole 22. In the same way, once the gas conduit 4 has been plastically deformed, it comprises an intermediate segment 41 arranged after the final segment 43. In this third embodiment, the intermediate segment 41 of the gas conduit 4 and the coupling segment 220 of the through hole 22 of the injector base 21 have a complementary hexagonal shape such that the gas conduit 4 is retained angularly with respect to the holder 2.

In this third embodiment the width of the through hole 22 is larger in the portion closest to the lower surface 211 of the injector base 21 than in the portion thereof closer to the upper surface 210 of the injector base 21, the width of the through hole 22 progressively decreasing as it moves away from said lower surface 211. Consequently, the cross-section of the intermediate segment 41 of the conduit 4 has a larger width in the portion arranged closer to the lower surface 211 of the injector base 21 than the cross-section of the intermediate segment 41 arranged closer to the upper surface 210 of said injector base 21. In this way cooperation between the intermediate segment 41 of the gas conduit 4 and the coupling segment 220 of the through hole 22 not only retains the gas conduit 4 angularly with respect to the holder 2 but furthermore collaborates in retaining the gas conduit 4 axially with respect to the holder 2. Thus, the gas conduit 4 is retained axially with respect to the holder 2 by means of the final segment 43 abutting with the upper surface 210 of the injector base 21 and cooperation between the intermediate segment 41 of the gas conduit 4 and the coupling segment 220 of the through hole 22.

FIGS. 13 to 16 show a fourth embodiment of the holder assembly 1 according to the invention.

The holder 2 of the holder assembly 1 of this fourth embodiment is a sheet metal part, preferably a sheet metal part formed by stamping. As discussed above the holder 2 comprises an injector base 21 and a burner base 20.

In this fourth embodiment the injector base 21 has a substantially rectangular shape. The injector base 21 comprises an upper surface 210 arranged facing the burner base 20 and a lower surface 211. The through hole 22 of the injector holder 21 extends between said upper surface 210 and said lower surface 211. In this fourth embodiment the coupling segment 220 of the through hole 22 covers the entire length of said through hole 22.

In this fourth embodiment the burner base 20 comprises a horizontal surface 200 and a cylindrical wall 201 projecting upwards from said horizontal surface 200, said cylindrical wall 201 defining a central housing configured for being coupled to a burner body, such that said central housing and the injector 3 below the central housing in the injector base 11 are in fluid communication. In this fourth embodiment the cylindrical wall 201 comprises two vertical positioning slots 202 on its inner surface arranged every 180° and configured for being coupled to respective protrusions of a burner body. Furthermore, the burner base 20 comprises two primary air ports 203 arranged after the cylindrical wall 201 which allow the passage of air from outside the gas cooking appliance in which the holder assembly 1 is arranged into same. Furthermore, the horizontal surface 200 of the burner base 20 comprises two fixing holes 204 configured for enabling the holder assembly 1 to be fixed to the corresponding cooking appliance. The horizontal surface 200 of the burner base 20 also comprises a radial extension 205 protruding and extending axially from the horizontal surface 200. The radial extension 205 comprises a hole configured for holding a spark electrode (not shown in the figures).

In this fourth embodiment the injector base 21 and the burner base 20 are attached to one another through an attachment arm 23 protruding orthogonally from one side of the injector base 21 upwardly, attaching said injector base 21 with the burner base 20.

Figure 16:
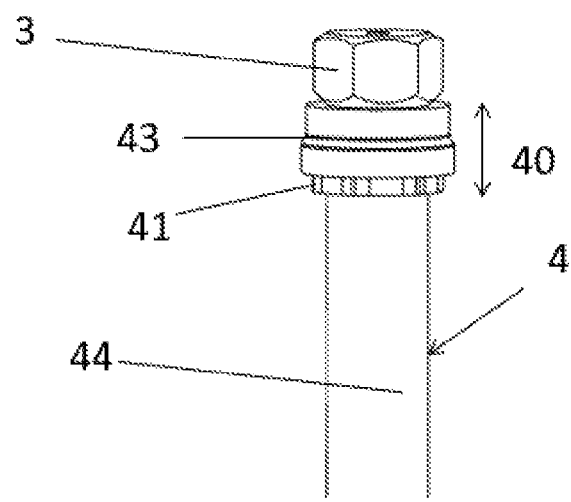
FIG. 16 shows a perspective view of the gas conduit and the injector of the holder assembly of FIG. 13.

FIG. 16 shows the gas conduit 4 of this fourth embodiment of the holder assembly 1, once it has been plastically deformed. FIG. 16 shows the first end 40 of the gas conduit 4, as well as a piece of the intermediate portion 44 attaching said first end 40 with a second end (not shown in the figures). The second end of the gas conduit 4 is configured for being coupled to the outlet of a corresponding gas valve. Before being plastically deformed, preferably the gas conduit 4 has a uniform tubular shape, i.e., before being plastically deformed the first end 40 of the gas conduit 4 preferably has the same shape as the intermediate portion 44 shown in FIG. 16. The first end 40 of the gas conduit 4 comprises the intermediate segment 41 having in this fourth embodiment a hexagonal cross-section complementary to the coupling segment 220 of the through hole 22 of the injector base 21. In this fourth embodiment the first end 40 of the gas conduit 4 also comprises a final segment 43 after the intermediate segment 41. Said final segment 43 is also plastically deformed after the gas conduit 4 is introduced in the through hole 22 of the injector base 21. Therefore, in this fourth embodiment the first end 40 of the gas conduit 4 is formed by the intermediate segment 41 and the final segment 43, the intermediate segment 41 being housed inside the through hole 22 of the injector base 21 whereas the final segment 43 is arranged on the upper surface 210 of the injector base 21. The final segment 43 of the gas conduit 4 comprises the mouth of the gas conduit 4 through which the injector 3 is introduced. In this fourth embodiment, when the gas conduit 4 is plastically deformed the inner surface of the gas conduit 4 is also deformed, obtaining a funnel-shaped inner surface of the gas conduit 4 with a first cylindrical portion 45, a frustoconical-shaped intermediate portion 46, and a second cylindrical portion 47 having a smaller diameter than the first cylindrical portion 45. Preferably, once the gas conduit 4 is plastically deformed, the first cylindrical portion 45 of the inner surface of the gas conduit 4 is threaded to enable screwing on the injector 3 later.

In this fourth embodiment the injector 3 comprises a central through hole 33 which allows the passage of gas through the inside of said injector 3. The injector 3 further comprises a head 31 arranged on the outside of the gas conduit 4, a cylindrical body 32 arranged in the first cylindrical portion of the gas conduit 4, and a frustoconical end 30 after said cylindrical body 32 and arranged in the frustoconical-shaped intermediate portion 46 of the gas conduit 4. The outer surface of the cylindrical body 32 of the injector 3 is preferably threaded.

In this fourth embodiment the end 30 of the injector 3 is fixed in an airtight manner against the inner wall of the gas conduit 4, namely against the frustoconical portion of the gas conduit 4. Furthermore, in order to ensure the airtightness of said fixing, in this fourth embodiment the end 30 of the injector 3 and therefore the frustoconical portion of the gas conduit 4 are on the same level as the through hole 22 of the injector base 21, such that when the injector 3 is fixed to the gas conduit 4 the holder 2 prevents radial expansion of the outer wall of the gas conduit 4.

In this fourth embodiment the width of the through hole 22 is larger in the portion closest to the lower surface 211 of the injector base 21 than in the portion thereof closer to the upper surface 210 of the injector base 21, the width of the through hole 22 progressively decreasing as it moves away from said lower surface 211. Consequently, the cross-section of the intermediate segment 41 of the gas conduit 4 has a larger width in the portion arranged closer to the lower surface 211 of the injector base 21 than the width of the cross-section of the intermediate segment 41 arranged closer to the upper surface 210 of said injector base 21. In this way cooperation between the intermediate segment 41 of the gas conduit 4 and the coupling segment 220 of the through hole 22 not only retains the gas conduit 4 angularly with respect to the holder 2 but furthermore collaborates in retaining the gas conduit 4 axially with respect to the holder 2. Thus, the gas conduit 4 is retained axially with respect to the holder 2 by means of the final segment 43 abutting with the upper surface 210 of the injector base 21 and cooperation between the intermediate segment 41 of the gas conduit 4 and the coupling segment 220 of the through hole 22.

Figure 17:
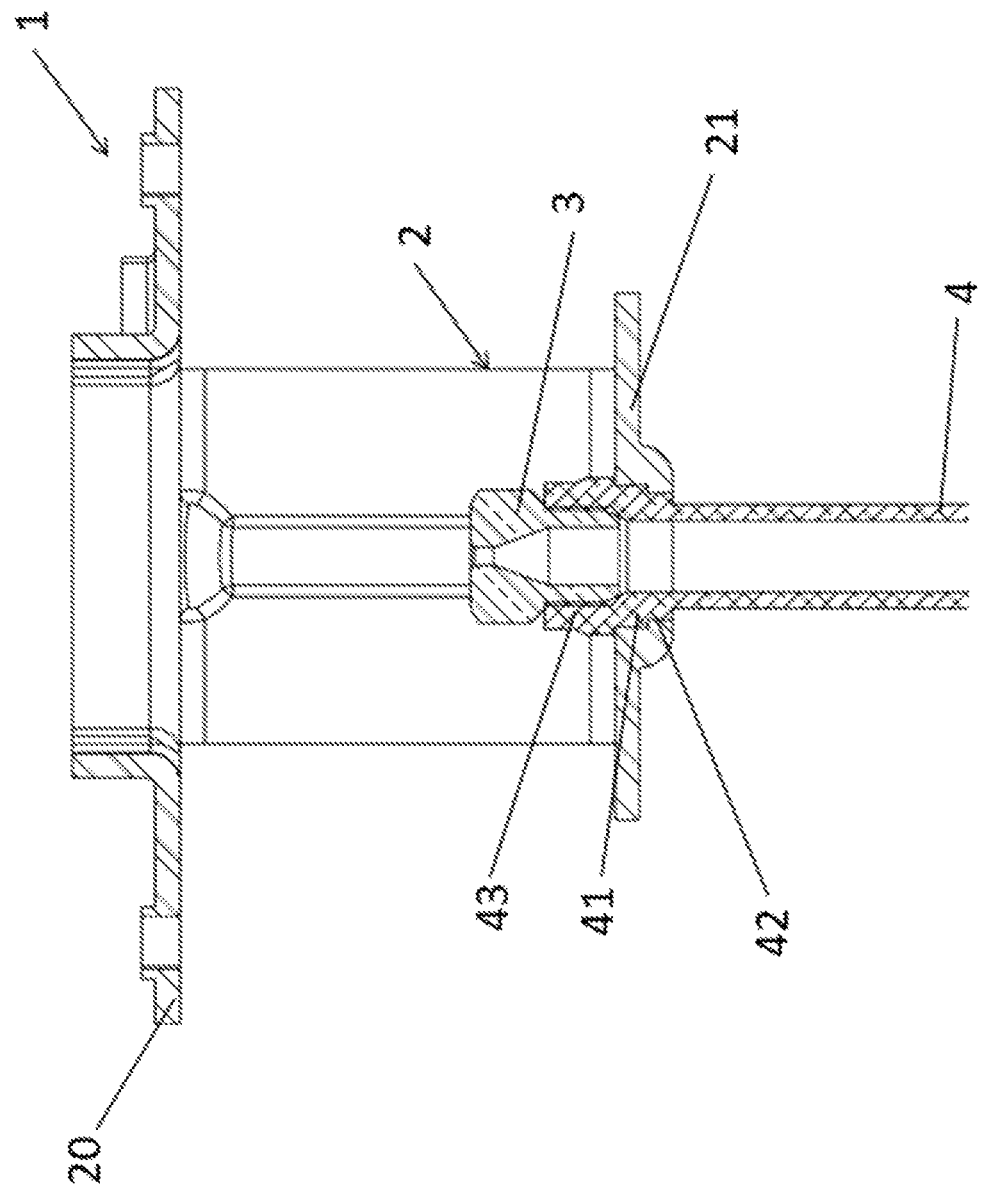
FIG. 17 shows a sectional view of a fifth embodiment of a holder assembly.
Figure 18:
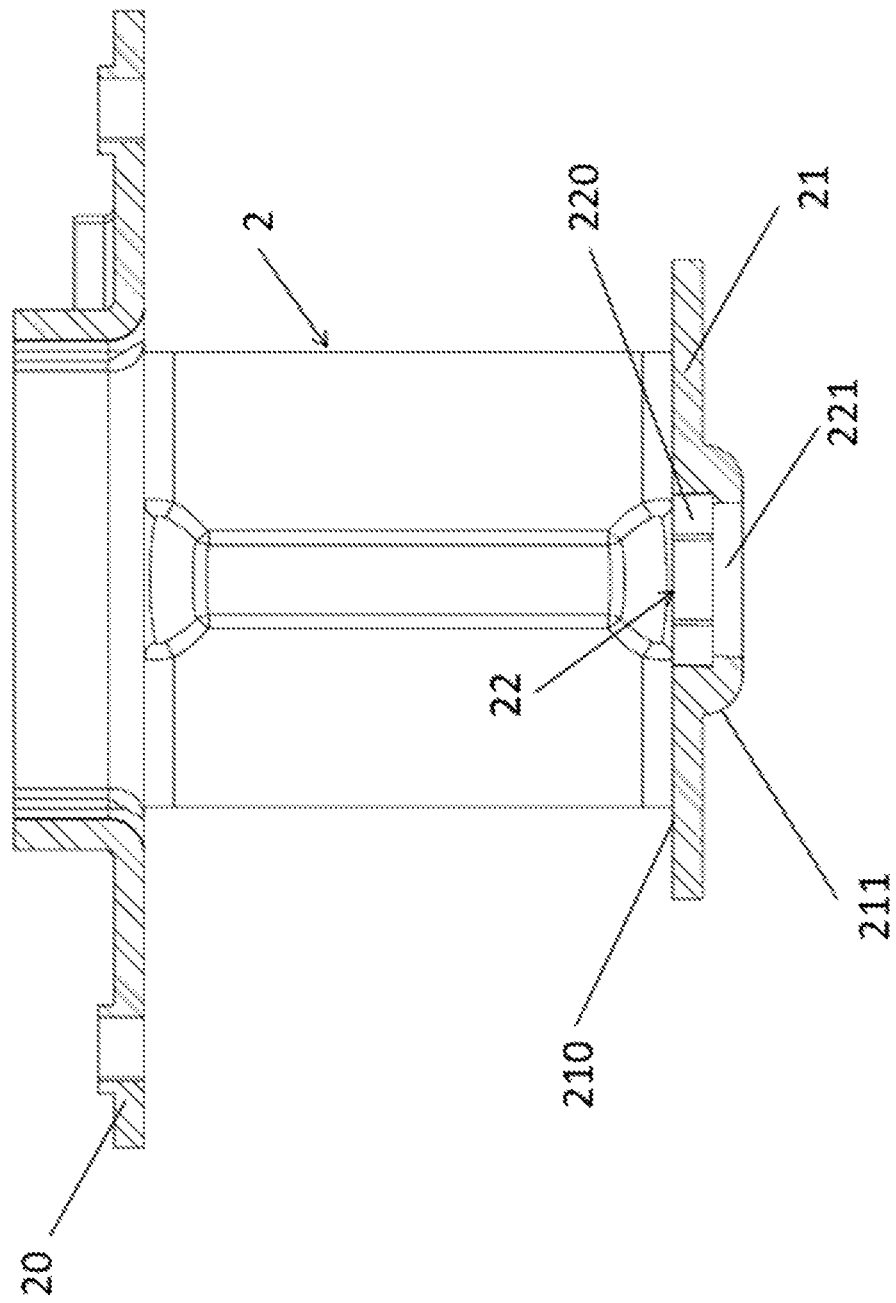
FIG. 18 shows a sectional view of the holder of the holder assembly of FIG. 17.

FIGS. 17 and 18 show a fifth embodiment of the invention.

This fifth embodiment differs from the fourth embodiment in the configuration of the through hole 22 of the injector base 21 of the holder 2 and accordingly of the outer shape of the first end 40 of the gas conduit 4. The rest of the features are similar to those of the fourth embodiment so it is not considered necessary to describe them again.

In this fifth embodiment the through hole 22 of the injector base 21 of the holder 2 comprises a coupling segment 220 and a circular section segment 221 arranged below the coupling segment 220. In the same way, once the gas conduit 4 has been plastically deformed, it comprises an intermediate segment 41 arranged after the final segment 43, and an additional segment 42 arranged after the intermediate segment 41. In this fifth embodiment, the intermediate segment 41 of the gas conduit 4 and the coupling segment 220 of the through hole 22 of the injector base 21 have a complementary hexagonal shape such that the gas conduit 4 is retained angularly with respect to the holder 2.

Furthermore, in this fifth embodiment the width of the through hole 22 progressively decreases as it moves away from the lower surface 211, i.e., the width of the circular section segment 221 gradually decreases as it moves away from the lower surface 211 of the injector base 21 and the width of the coupling segment 220 gradually decreases as it moves closer to the upper face 210 of the injector base 21. Accordingly, the cross-section of the intermediate segment 41 and the additional segment 42 of the gas conduit 4 also has a decreasing width complementary to the through hole 22. In this way cooperation between the gas conduit 4 and the through hole 22 not only retains the gas conduit 4 angularly with respect to the holder 2 but furthermore collaborates in retaining the gas conduit 4 axially with respect to the holder 2. Thus, the gas conduit 4 is retained axially with respect to the holder 2 by means of the final segment 43 abutting with the upper surface 210 of the injector base and the decreasing width of the through hole 22.

Figure 19:
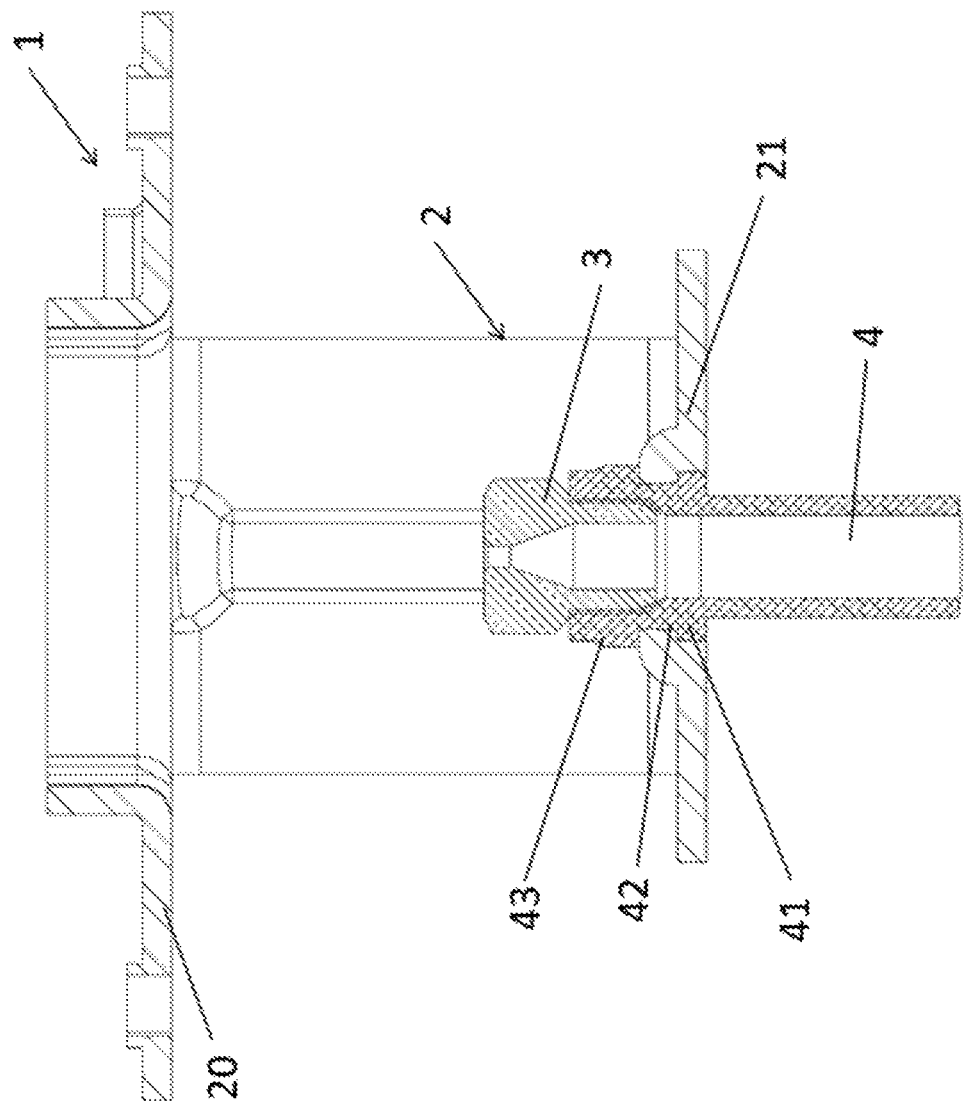
FIG. 19 shows a sectional view of a sixth embodiment of a holder assembly.
Figure 20:
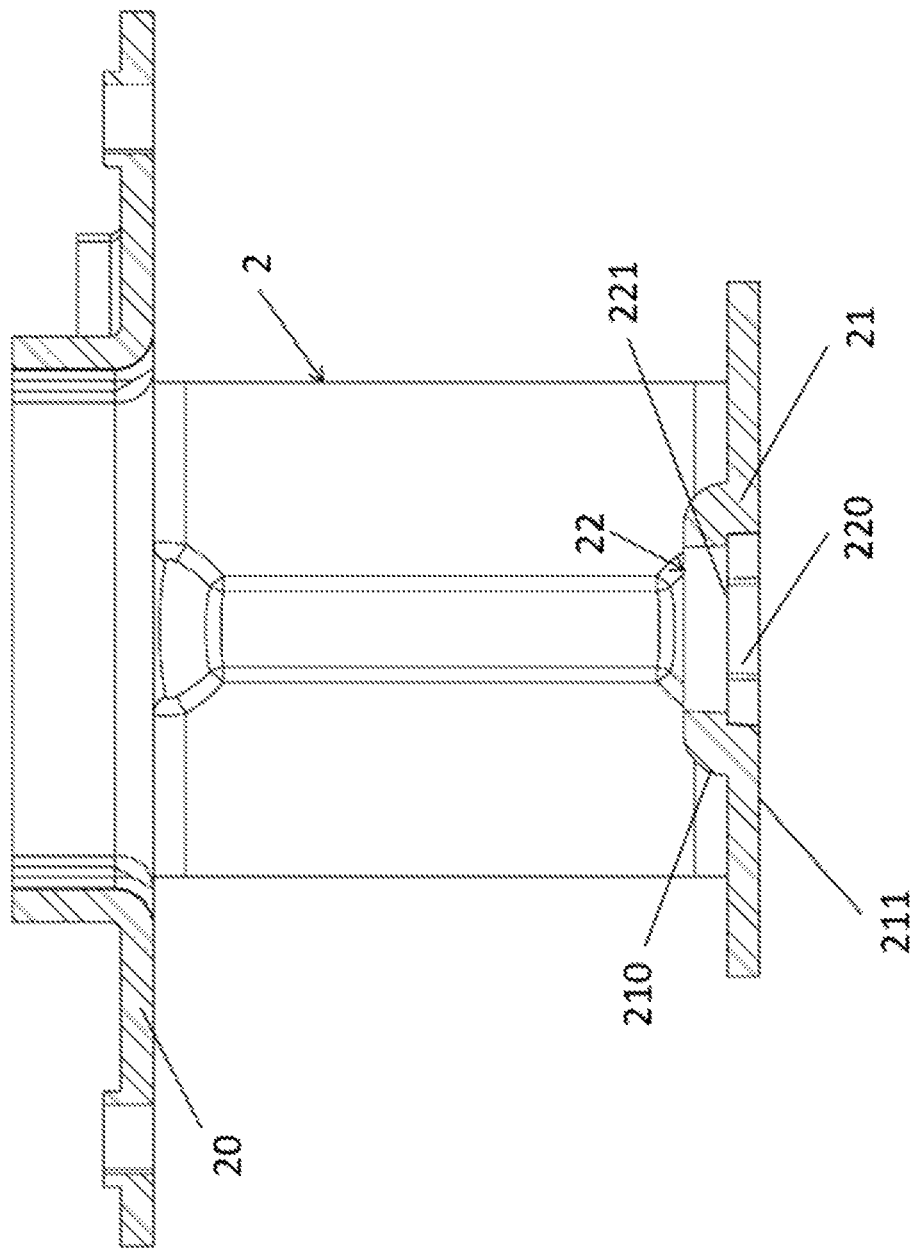
FIG. 20 shows a sectional view of the holder of the holder assembly of FIG. 19.

FIGS. 19 and 20 show a sixth embodiment of the invention.

This sixth embodiment differs from the fourth embodiment in the configuration of the through hole 22 of the injector base 21 of the holder 2 and accordingly of the outer shape of the first end 40 of the gas conduit 4. The rest of the features are similar to those of the fourth embodiment so it is not considered necessary to describe them again.

In this sixth embodiment in addition to the coupling segment 220 the through hole 22 comprises a circular section segment 221, the coupling segment 220 being arranged below the circular section segment 221. In the same way, once the gas conduit 4 has been plastically deformed, it comprises an intermediate segment 41, an additional segment 42 arranged after the intermediate segment 41, and a final segment 43 arranged after the additional segment 42. In this sixth embodiment, the intermediate segment 41 of the gas conduit 4 and the coupling segment 220 of the through hole 22 of the injector base 21 have a complementary hexagonal shape such that the gas conduit 4 is retained angularly with respect to the holder 2.

Furthermore, in this sixth embodiment the width of the through hole 22 progressively decreases as it moves away from the lower surface 211, i.e., the width of the coupling segment 220 gradually decreases as it moves away from the lower surface 211 of the injector base 21 and the width of the circular section segment 221 gradually decreases as it moves closer to the upper face 210 of the injector base 21. Accordingly, the cross-section of the intermediate segment 41 and the additional segment 42 of the gas conduit 4 also has a decreasing width complementary to the through hole 22. In this way cooperation between the gas conduit 4 and the through hole 22 not only retains the gas conduit 4 angularly with respect to the holder 2 but furthermore collaborates in retaining the gas conduit 4 axially with respect to the holder 2. Thus, the gas conduit 4 is retained axially with respect to the holder 2 by means of the final segment 43 abutting with the upper surface 210 of the injector base 21 and the decreasing width of the through hole 22.

A second aspect of the invention relates to a gas cooking appliance comprising at least one holder assembly 1 according to that described in the first aspect of the invention.

The following clauses disclose in an unlimited way additional embodiments.

Clause 1. Holder assembly for a burner of a gas cooking appliance, comprising
- a gas conduit 4,
- an injector 3 partially housed at a first end 40 of said gas conduit 4, and
- a holder 2 comprising a burner base 20 and an injector base 21 arranged below the burner base 20, the injector base 21 comprising a through hole 22 in which a portion of the first end 40 of the gas conduit 4 is arranged such that the injector 3 is oriented towards the burner base 20,
- the first end 40 of the gas conduit 4 comprising a plastically deformed intermediate segment 41 for coupling said gas conduit 4 to the injector base 21,
- the through hole 22 of the injector base 21 comprises at least one coupling segment 220 with a cross-section larger than the cross-section of the gas conduit 4 when said gas conduit 4 is introduced in said through hole 22,
- the intermediate segment 41 of the gas conduit 4 being formed after the gas conduit 4 is introduced in the through hole 22 of the injector base 21, such that the intermediate segment 41 of the gas conduit 4 is plastically deformed covering said coupling segment 220,
- the coupling segment 220 having a non-circular cross-section for angularly retaining the gas conduit 4 with respect to the holder 2.

Clause 2. Holder assembly according to clause 1, wherein the coupling segment 220 has a polygonal cross-section, preferably the coupling segment 220 has a hexagonal cross-section.

Clause 3. Holder assembly according to any of the preceding clauses, wherein the end 30 of the injector 3 housed inside the gas conduit 4 is fixed in an airtight manner against the inner surface of the gas conduit 4, said end of the injector 30 being arranged on the same level as the through hole 22 of the injector base 21, such that when the injector 3 is fixed to the gas conduit 4 the holder 2 prevents radial expansion of the outer wall of the gas conduit 4.

Clause 4. Holder assembly according to any of the preceding clauses, wherein the through hole 22 of the injector base 21 comprises a circular section segment 221 and the coupling segment 220.

Clause 5. Holder assembly according to clause 4, wherein the coupling segment 220 is arranged below the circular section segment 221.

Clause 6. Holder assembly according to clause 5, wherein part of the intermediate segment 41 of the gas conduit 4 protrudes radially with respect to the additional segment 42, such that the upper horizontal surface 410 of the intermediate segment 41 protruding with respect to the additional segment 42 abuts with a complementary horizontal surface of the through hole (22) of the injector base 21.

Clause 7. Holder assembly according to clause 4, wherein the coupling segment 220 is arranged above the circular section segment 221.

Clause 8. Holder assembly according to clause 7, wherein the section of the coupling segment 220 is smaller than the section of the circular section segment 221.

Clause 9. Holder assembly according to any of clauses 1 to 3, wherein the coupling segment 220 covers the entire length of the through hole 22.

Clause 10. Holder assembly according to any of the preceding clauses, wherein at least one segment of the through hole 22 has a larger width in the portion thereof closer to the lower surface 211 of the injector base 21 than the width of said segment of the through hole 22 arranged farther away from said lower surface 211.

Clause 11. Holder assembly according to any of the preceding clauses, wherein the gas conduit 4 comprises a stop segment supported on the lower surface 211 of the injector base 21.

Clause 12. Holder assembly according to any of the preceding clauses, wherein the end segment 43 of the first end 40 of the gas conduit 4 is plastically deformed on the injector base 21.

Clause 13. Holder assembly according to any of the preceding clauses, wherein the holder 2 is a part manufactured by injection, preferably an injected aluminum part.

Clause 14. Holder assembly according to any of clauses 1 to 12, wherein the holder 2 is a sheet metal part, preferably a stamped sheet metal part.

Clause 15. Gas cooking appliance comprising at least one holder assembly 1 according to any of the preceding clauses.

What is claimed is:

1. A holder assembly for a burner of a gas cooking appliance, the holder assembly comprising:
   a holder including a burner base and an injector base arranged below the burner base, the injector base including a through hole, the through hole including a coupling segment having a non-circular cross-section delimited by an inner wall;
   a gas conduit having a first end, the first end including an intermediate segment that is plastically deformed inside the coupling segment such that an outer surface of the intermediate segment abuts the inner wall of the coupling segment, the non-circular cross-section of the coupling segment preventing the first end of the gas conduit from rotating inside the coupling segment; and
   an injector partially housed at the first end of the gas conduit, the injector having a central through opening with a gas outlet facing in a direction of the burner base.

2. The holder assembly according to claim 1, wherein the coupling segment has a polygonal cross-section.

3. The holder assembly according to claim 1, wherein the injector has an end housed inside a part of the gas conduit residing inside the through opening of the injector base, the end of the injector being fixed in an airtight manner against an inner surface of the part of the gas conduit, an outer wall of the part of the gas conduit being limited in radial expansion by an inner surface of the through opening.

4. The holder assembly according to claim 1, wherein the through hole of the injector base further comprises a circular section segment located above or below the coupling segment.

5. The holder assembly according to claim 4, wherein the coupling segment is located below the circular section segment, the first end of the gas conduit including an additional segment located above the intermediate segment, a part of the intermediate segment protruding radially with respect to the additional segment, an upper horizontal surface of the intermediate segment protruding with respect to the additional segment abuts with a complementary horizontal surface inside the through hole of the injector base.

6. The holder assembly according to claim 4, wherein the coupling segment is arranged above the circular section segment, a cross-section of the coupling segment being smaller than a cross-section of the circular section segment.

7. The holder assembly according to claim 1, wherein the through hole of the injector base has a length, the coupling segment extending across an entirety of the length of the through hole.

8. The holder assembly according to claim 1, wherein a segment of the through hole has an upper end and a lower end, the upper end having a first width, the lower end having a second width greater than the first width.

9. The holder assembly according to claim 1, wherein the gas conduit includes a stop segment supported on a lower surface of the injector base that inhibits axial movement of the gas conduit in a direction towards the burner base.

10. The holder assembly according to claim 1, wherein the first end of the gas conduit includes an upper end segment located above the intermediate segment, the upper end segment being plastically deformed such that a surface of the upper end segment abuts an upper surface of the injector base to inhibit axial movement of the gas conduit in a direction away from the burner base.

11. The holder assembly according to claim 1, wherein a part of the injector includes external threads and a part of the first end of the gas conduit includes internal threads, the injector being secured to the gas conduit by a mating of the external threads with the internal threads.

12. The holder assembly according to claim 1, wherein the outer surface of the intermediate segment has a shape complimentary to a shape of the inner wall of the through hole.

13. The holder assembly according to claim 3, wherein the end of the injector housed inside the part of the gas conduit has a frustoconical shape.

14. The holder assembly according to claim 13, wherein the inner surface of the part of the gas conduit has a frustoconical shape.

15. The holder assembly according to claim 1, wherein the holder comprises a single piece injection molded part.

16. The holder assembly according to claim 1, wherein the burner base and injector base are made of sheet metal.

17. A method of making a holder assembly for a gas burner of a cooking appliance, the method comprising:
obtaining a holder that includes a burner base and an injector base arranged below the burner base, the injector base including a through hole, the through hole including a coupling segment having a non-circular cross-section delimited by an inner wall;
inserting a first end of a gas conduit into the through hole of the injector base, the first end of the gas conduit having an outer diameter less than an inner diameter of the through hole;
plastically deforming an intermediate segment of the gas conduit inside the coupling segment such that an outer surface of the intermediate segment abuts the inner wall of the coupling segment, the non-circular cross-section of the segment preventing the first end of the gas conduit from rotating inside the coupling segment; and
attaching an end of an injector to the first end of the gas conduit in an airtight manner, the injector having a central through opening with a gas outlet, the injector being attached to the first end of the gas conduit so that the gas outlet faces in a direction of the burner base.

18. The method according to claim 17, wherein the gas conduit has a stop segment, the method further comprising arranging the gas conduit in the through hole such that the stop segment is supported on a lower surface of the injector base in a manner that inhibits axial movement of the gas conduit in a direction towards the burner base.

19. The method according to claim 17, wherein the gas conduit includes an upper end segment located above the intermediate segment, the method further comprising plastically deforming the upper end segment such that a surface of the upper end segment abuts an upper surface of the injector base to inhibit axial movement of the gas conduit in a direction away from the burner base.

20. The method according to claim 17, wherein the through opening of the injector base includes a horizontal surface internal to the through opening, the gas conduit having a central longitudinal axis and when the intermediate segment is plastically deformed, the intermediate segment includes an external horizontal surface that is arranged orthogonal to the central longitudinal axis and abutting the horizontal surface internal to the through opening.

* * * * *